United States Patent [19]

Migliori

[11] Patent Number: 5,402,816
[45] Date of Patent: Apr. 4, 1995

[54] PRESSURE EQUALIZER DEVICE

[75] Inventor: Luciano Migliori, Milan, Italy

[73] Assignee: Univer S.P.A., Milan, Italy

[21] Appl. No.: 221,780

[22] Filed: Apr. 1, 1994

[30] Foreign Application Priority Data

Apr. 5, 1993 [IT] Italy ............................... MI93A0672

[51] Int. Cl.$^6$ .......................................... F16K 17/04
[52] U.S. Cl. .................................................. 137/115
[58] Field of Search ........................ 137/115, 116, 494

[56] References Cited

U.S. PATENT DOCUMENTS 4,171,708 10/1979 Pareja ................................. 137/115
4,791,950 12/1988 Pedersen ........................... 137/115

Primary Examiner—Robert G. Nilson
Attorney, Agent, or Firm—Young & Thompson

[57] ABSTRACT

A pressure equalizer device for load balancing systems; the device comprises an hollow body (16) defining a pressure equalizing chamber having fluid inlet and outlet apertures at opposite ends thereof, and a pressure release valve on the outlet side of the chamber; the pressure release valve is actuated by a floating pilot piston urged by a biasing spring to close the valve; at least one unidirectional flow passage, 23) is provided between the two side of pressure equalizing chamber to feed the pressurized fluid on both sides of the floating pilot piston of the device.

10 Claims, 3 Drawing Sheets

PRESSURE EQUALIZER DEVICE

TECHNICAL FIELD OF THE INVENTION

The present invention relates to a pneumatic pressure equaliser device particularly suitable for application in load balancing systems, by means of which it is possible to use a pressurised fluid source to balance static or dynamic loads, in place of traditional load balancing devices, according to which it is possible to balance constantly a mass or a moving load by a pneumatic or hydraulic system, using small applied forces to control the displacement of the load.

BACKGROUND OF THE INVENTION

To balance the inertia or weight of moving loads or masses, use is generally made of mechanical counterweights and/or elastic systems which allow for a partial compensation of the weight of a body and the moving of even very heavy loads, with comparatively small applied forces in relation to the load to be balanced.

The use of mechanical counterweighting and/or elastic balancing systems is considerably limited in that these systems are normally bulky or do not allow an adequate balancing action of the load, or behaviour, which is independent or unrestricted by the load to be controlled and its displacement direction.

In particular, the need to move masses with acceptable speeds and accelerations, at times requires the use of high power levels, with consequently expensive and bulky drives and complex control systems.

Pneumatic or hydraulic systems which use standard pressure-regulating valves are not able to achieve an effective balancing due to the impossibility of modifying the hydraulic or pneumatic action to balance the load while maintaining it under constant and strictly controlled conditions.

The object of the present invention is to provide a pressure equaliser device in a hydraulic or pneumatic load balancing system, whose action is totally constant and independent of the mass or of the load to be controlled, and cannot be influenced by the moving direction of the load itself.

A further object of the present invention is to provide a pressure equaliser device for load balancing which is highly reliable, simple in construction, economical and with minimal overall dimensions.

A further object again of the present invention is to provide a pressure equaliser device for a load balancing system, which is able to maintain an exactly constant balancing pressure, ensuring fast feed and venting or pressure releasing of the pressurised fluid without causing hazardous back pressures which otherwise could unbalance the load or slow down its movement.

SUMMARY OF THE INVENTION

The above can be achieved by means of a pressure equaliser device for the pneumatic or hydraulic balancing of loads, according to the present invention, which makes use of a pressure release valve, on the outlet side of the device, actuated by a floating piston inside a pressure balancing chamber having both sides connected to the source of a pressurised fluid fed to a load-balancing system by an unidirectional flow passage.

BRIEF DESCRIPTION OF THE DRAWING

The general features of the pressure equaliser device according to the invention, and some preferred embodiments thereof, will be illustrated in greater detail hereinbelow, with reference to the accompanying drawings, in which.

DETAILED DESCRIPTION OF THE INVENTION

Figure 1:
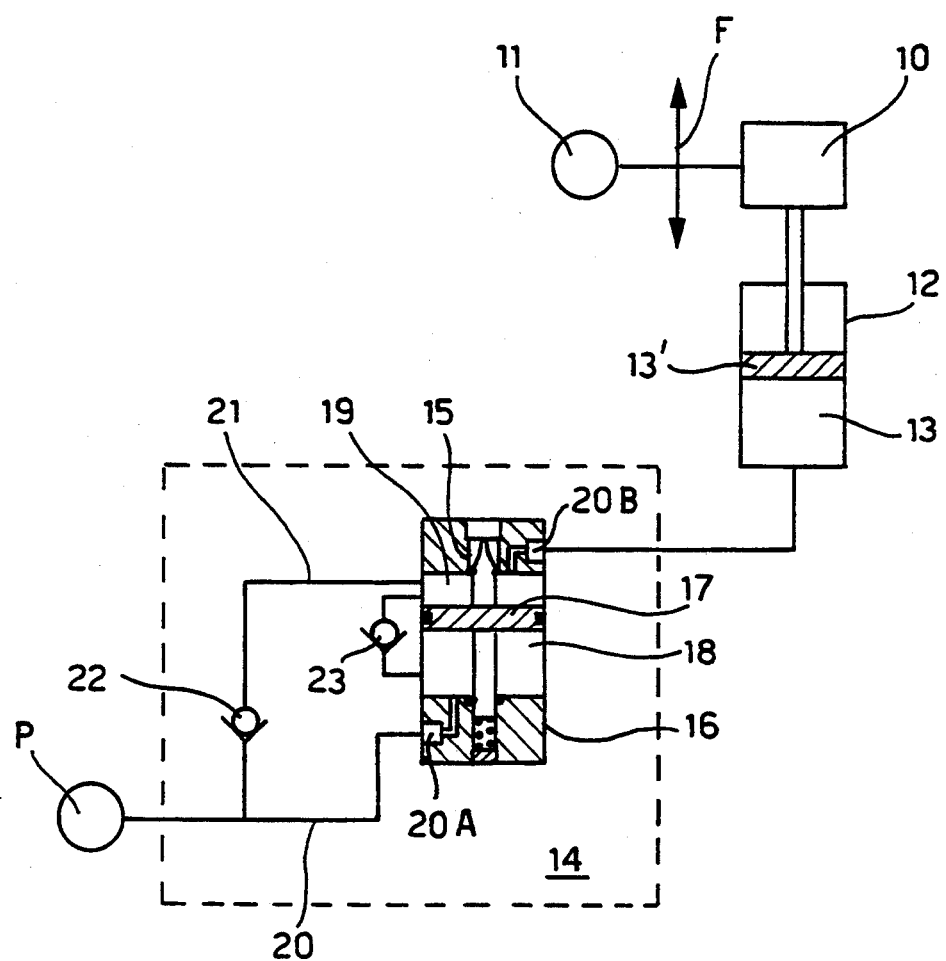
FIG. 1 is a generical diagram of the pressure equaliser device according to the invention.

With reference to FIG. 1, reference number 10 denotes a generical load to be balanced which can be up and down moved in the two directions of the arrow F, for example by means of a drive motor 11. The load 10 is connected to the rod of a pneumatic balancing cylinder 12, of the single-acting type, whose chamber 13 is connected, in the manner described hereinbelow, to a source P of a fluid at constant pressure, by means of a pressure equaliser device 14.

As shown in the diagram in FIG. 1, the pressure equaliser device 14 comprises a pressure releasing path provided with a relief or venting valve 15, for example of ON-OFF, proportional or incremental type, actuated by a pilot cylinder 16 having a floating piston 17 appropriately guided on both sides and controlled in a floating manner by opposing pressure forces, inside a pressure equalising chamber of the cylinder, both parts 18 and 19 of the chamber of the pilot cylinder 16 being conjunctly connected to a same source of pressurised fluid P having a constant pressure value.

More precisely, the inlet side 18 of the chamber of the pilot cylinder 16, hereinunder also referred to as thrust chamber, that is on the side of inlet 20A, is directly connected to the pressure source P via a conduit 20, whereas the outlet side 19 of the same chamber, hereinafter also referred to as counterpressure chamber, that is on the side of outlet 20B, according to one embodiment may be directly connected to the pressurised fluid source P by a path 21 comprising a check valve 22. The outlet side 19 of the pressure equalising chamber is moreover connected directly to the relief value 15 and to the chamber 13 of the load-balancing cylinder 12 respectively, as shown in FIG. 1.

Reference number 23 in FIG. 1 finally denotes an unidirectional path between inlet and outlet sides of the chamber, Which connects the outlet 20B of the chamber of the pilot cylinder 16, to the inlet 20A via a path comprising the same pressure chamber.

Figure 2:
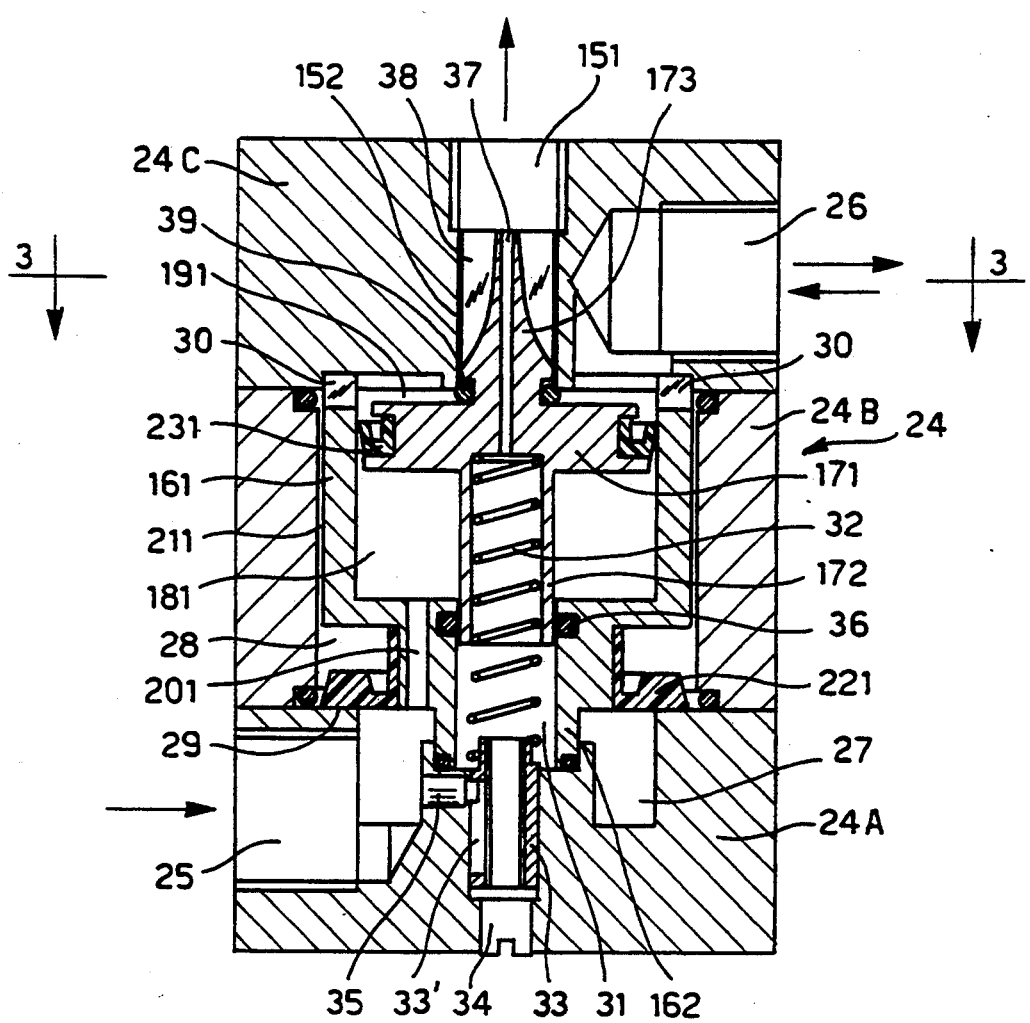
FIG. 2 is a longitudinal sectional view of a first embodiment of the pressure equaliser device according to the invention.
Figure 3:
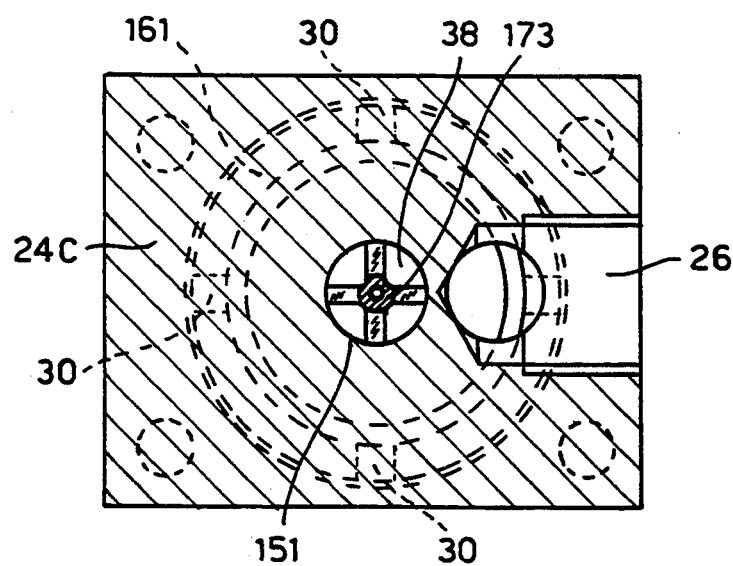
FIG. 3 is a cross-sectional view along line 3—3 of FIG. 2.

A first embodiment of the pressure equaliser device 14 will be illustrated hereinunder, with reference to the FIGS. 2 and 3 of the accompanying drawings, specifying that in said figures the same reference numerals as in FIG. 1 will be used, followed by a serial number to indicate similar parts or equivalent functioning.

As shown in the above mentioned figures, the device comprises a body 24 formed of several parts 24A, 24B and 24C, having an inlet aperture 25 on one side for connection to the pressurised fluid source P, and an outlet aperture 26 at the opposite side for connection to the load-balancing system.

The inlet aperture 25 opens into an annular chamber 27 of the body part 24A, which is connected via a passage 201 to the inside chamber of a cup-shaped element 161 corresponding to the pilot cylinder 16 of FIG. 1.

Inside the cup element 161 is a floating piston member 171, having a diameter slightly smaller than the inside diameter of the cup element 161; the piston member 171 is provided with an upside-down lip seal 231 which separates the two sides 181 and 191 respectively of the pressure equalising chamber inside the cup element 161, said lip seal 231 also providing a unidirectional passage and valving means between the inlet side 181 and the outlet side 191 of the chamber, performing functions identical to those of the check valve in the path 23 of FIG. 1.

The cup element 161 which, together with the floating piston 171, forms the pilot cylinder for balancing the pressure by actuating the relief valve, is seated into the cylindrical cavity of the central portion 24B of the body 24 so as to define with the latter an annular chamber 28 which communicates with the first annular chamber 27 of the body portion 24A, via a diaphragm valve 221 forming a seal against an annular seating 29 of the body portion 24A.

The annular chamber 28 inside the intermediate body portion 24B, is in turn connected to the outlet side 191 of the pressure equalising Chamber of the pilot cylinder, via an annular path 211 between the cup element 161 and the annular intermediate part 24B of the body, said annular path 211 opening towards the chamber 191 through radial slots 30 on the upper edge of the cup element 161.

In order to maintain a condition of floating equilibrium, constantly balanced on both faces of the piston 171, the latter is guided by two opposite rod extensions 172 and 173 which slide in respective guide holes 31 and 152, the first provided in a small-diameter rear part of the cup element 161, and the second in the upper body portion 24C, coaxially to the outlet opening 151 of the relief valve.

An elastically yielding biasing means such as the spring 32 penetrates into the cavity of the guide rod 172, resting with an end of an adjusting sleeve 33 slidingly guided in a cylindrical bore of the lower body portion 24A in FIG. 2. The compression of the spring 32 can be adjusted by sliding the sleeve 33 acting on a screw 34. The sleeve 33 is prevented from rotating by a check pin 35 which penetrates a longitudinal slot 33' of the abovementioned sleeve.

So as to avoid even a minimal pressure gradient in the cavity for the spring 32, which could affect the correct balancing of the pressure on the floating piston 171, an O-Ring seal 36 has been provided for the rear guide rod 172, as well as an axial venting passage 37 in the guide rod 173 which connects this cavity of the guide rod 172 to the release opening of the valve 151.

As previously related, the relief valve 151 is defined by a hole 152 in the body portion 24C, and by the front extension or guide rod 173 of the floating piston 171. In this respect the front guide rod 173 consists of a cylindrical spool member provided with longitudinal slots 38 having an arched profile, to provide an incremental release action of the pressure; the release action increases in proportion to the sliding movement of the same spool 173 under the control of the floating piston 171 of the pilot cylinder, according to a proportional law which varies according to the arched profile of the same slots. An O-Ring seal 39 is provided on the guide rod 173 near the piston 171 acting as valving seat to close the pressure releasing outlet 151. Furthermore the proportional valve member 173 may be omitted and substituted with an ON-OFF type.

In all cases, with a pressure equaliser device according to the invention, even if reduced or small in size, it is possible to obtain wide passages for fluid communication which ensure extremely rapid operative times and reliable constancy of the fluid pressure at the outlet aperture 26 of the pressure equaliser device, and consequently in the load-balancing cylinder 12 of FIG. 1, connected thereto. Moreover, in a balancing system which makes use of the device according to the invention, by appropriately choosing values for the fluid pressure and dimensions of the same balancing cylinder 12, it is possible to balance loads of whatsoever weight, maintaining substantially unchanged the features and dimensioning of the pressure equaliser device 14.

The working of the pressure equaliser device according to the invention will be explained hereinbelow with reference to the diagram in FIG. 1.

It is assumed that the load 10 is at a standstill and that the entire system is in equilibrium, with the chamber 13 of the load-balancing cylinder 12, the outlet side 18, and inlet side 19 of the pressure equalising chamber of the pilot cylinder 16 for the relief valve 15, which are at the same pressure of the fluid supplied by the source P. In these conditions the weight of the load 10 is perfectly balanced by the action of the cylinder 12.

We shall now assume it necessary to move the load 10 upwards: since its weight is perfectly balanced by the thrust of the cylinder 12, only a small force has to be exerted on the load by the motor 11, sufficient to overcome the frictional forces or the minor internal resistances of the system, which oppose the movement of the load itself. In fact, as soon as the piston 13' of the balancing cylinder 12 tends to move upwards and to cause a momentary reduction in the pressure of the fluid in the chamber 13, given that the relief valve 15 of the a biasing spring acting on the floating piston 17, and since chamber sides 18, 19 are at the same pressure of the fluid fed by the source P, the fluid pressure in the chamber 13 of the balancing cylinder 12 will be maintained constant in that fluid will be immediately fed at the same pressure value through the conduit 21 and/or path., 23, maintaining perfect balance of the load 10 during its movement. Since the same pressure P is always maintained on the two faces of the floating piston 17, the relief valve 15 will be maintained constantly closed.

If for any reason the speed of the load 10 tends to change, causing increases or decreases in the pressure of the fluid in the chamber 13 of the balancing cylinder 12, the pressure equaliser device 14 is triggered automatically and rapidly to restore the equilibrium conditions of the load by allowing the feeding of pressurised fluid from the source P, or by releasing pressurised fluid through the valve 15, in order to maintain the pressure at the outlet aperture 20B and in the chamber 13 of the balancing cylinder at a constant value.

In fact any increase in the speed of the load 10 tending to reduce the pressure in the chamber 13, would cause an automatic feeding of fluid from the source P, whereas any deceleration in the load 10 tending to cause an increase in the pressure in the cylinder 12, would cause a simultaneous increase of the pressure in the chamber side 19 of the pilot cylinder which would move the floating piston 17 backwards, causing the opening of the relief valve 15. Since the chamber inlet side 18 of the pilot cylinder is constantly fed with fluid at a constant pressure value by the source P, the short backward movement of the floating piston 17 is enabled by the unidirectional passage of the valve 23 between the two chambers 18 and 19, or by the flowing of the fluid through the lip seal 231 in the example in FIG. 2. In all cases the chamber outlet side 19 of the pilot cylinder will be constantly fed by the source P with fluid at a constant pressure, immediately restoring the equilibrium conditions of the entire system. The floating piston 17 may therefore oscillate around a position of equilibrium, to allow or to prevent respectively the outflow of pressurised fluid through the relief valve 15 which maintains the pressure of the fluid in the equaliser device and in the balancing cylinder, under constant control and regulated to the required value, independently of the quantity and direction of movement of the load 10. The same working occurs in the case wherein the load 10 is moved by the motor 11 in a direction opposite the one previously assumed.

In all cases constant balancing of the load will be achieved at the calculated pressure value, thanks to the particular working of the pressure equaliser device which has a highly sensitive pilot piston and wide passages for the fluid to flow through, which ensure instantaneous triggering of the device for a constant feed of the pressurised fluid and a release action of the pressure differences which tend to form occasionally between the two chamber sides of the pilot cylinder, restoring it to the original value. The low frictional forces of the device, the use of a pilot cylinder having a floating piston which is perfectly balanced thanks to the guide action, and the arrangement of the relief valve, as well as the particular configuration of the device itself, allow extremely effective pneumatic or hydraulic balancing, with low cost and high reliability. The pressure equaliser device for the balancing of loads according to the invention is also suitable for effective use in balancing any type of load and in acting independently of the direction of movement of the load, disposing the pressure equaliser device in any position or at any distance required, in a manner totally unrestricted by the application of the device and of its work conditions.

Figure 4:
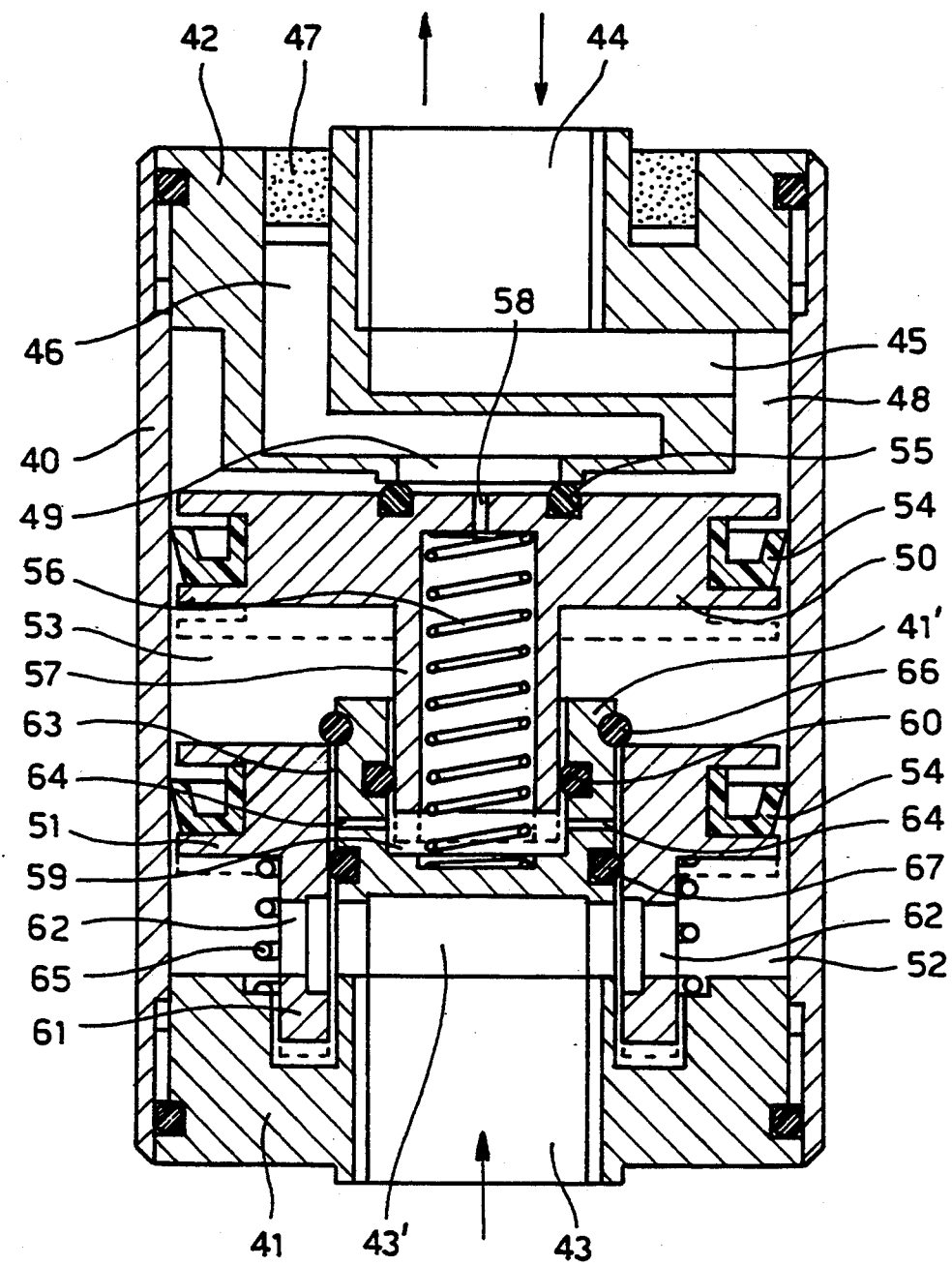
FIG. 4 is a longitudinal sectional view of a second embodiment of the invention.

The FIG. 4 of the drawing relates to a second embodiment of the equaliser device according to the invention which makes use of two floating pistons to reduce the pressure difference acting on both sides of the floating piston during the pilotage of the relief valve, substantially maintaining said pressure difference at a constant value irrespective of the movement or stroke of the same floating piston.

As shown in FIG. 4, the device comprises an hollow body or cylindrical sleeve 40 defining a pressure equalising chamber closed by end pieces 41 and 42.

The end piece 41, has a fluid inlet aperture 43 coaxially arranged to the chamber, while end piece 42 comprises an outlet aperture 44 that in the example shown is axially aligned to the inlet aperture and opens on a side of the pressure equalising chamber through a hole 45.

The end piece 42 on the outlet side 44, is provided with a first pressure releasing path 47 opening on one side to atmosphere through a filter 47, while on the other side opens towards the outlet side 48 of the pressure equalising chamber, through the venting port 49 of a relief valve actuated by a floating piston 50, said port 49 being coaxially arranged to the outlet aperture 44 for the pressurised fluid.

A first floating piston 50 and a second floating piston 51, axially spaced from the previous one, are provided inside the pressure equalising chamber of the device to form three chamber portions comprising: the end portion 48 on the outlet aperture side 44, the end portion 52 on the inlet aperture side 43, and the intermediate portions 53 between the two piston 50 and 51 for the scope described furtheron.

A lip type seal 54 protrudes from a seating on the peripheral edge of both floating pistons 50 and 51 to define a valving means between facing peripheral surfaces of the pistons and the inner chamber, to allow the pressurised fluid to flow in one direction only, from the inlet 43 to the outlet 44, allowing flow communication among the three portions 32, 53 and 48 of pressure equalising chamber. Therefore, during usual working conditions of the device, the constant pressure value existing on the inlet side is provided on the faces of both floating pistons 50 and 51, which pressure is fed to the output and to any user or load balancing system as previously referred to.

Both floating pistons 50 and 51 are suitably guided and forward elastically biased in their moving direction to pilot the valving means to open and close the first pressure releasing path 46, and to open and close a second pressure releasing path 63, respectively, to communicate the intermediate portion 53 of the chamber with the outside, for example through the same first pressure releasing path 46.

More precisely, a first closure valving means for relief valve aperture 49 is provided by the same first floating piston 50 conjunctly to an O-Ring seal 59 in an annular seating on the side of the piston 50 facing the relief port 49; the piston 50 is elastically biased towards the port 49 by a spring 56 housed in the hollow rod 57 for guiding the floating piston 50. The cavity of the rod 57 opens into the pressure releasing path 46 by means of an axial bore 58 opening on the side of the piston facing the relief port 49.

The rod 57 of the floating piston 50 is axially guided in a cylindrical dead hole 59 provided in an extension 41' of the end piece 41, protruding inside the chamber of the device. An O-Ring seal 60 has been provided to seal between opposing surfaces of rod 57 and guiding hole 59.

The second floating piston 51 is provided in the form of an annular piston member having an hollow cylindrical rod 61 sliding on an outer guiding surface of the extension 41'. The cylindrical rod 61 of the second piston is furthermore provided with radial passages 62 by which and by a cross hole 63 in the extension 41', the inlet 43 of the device communicates with corresponding inlet side 52 of the inner chamber of the pressure equaliser device.

The piston 51 is sliding on the extension 41' by a small clearance to define an annular gap 63 for a second pressure releasing path; the second pressure releasing path communicates with the first pressure releasing path through the radial holes 65, the guide hole 59, the cavity of the rod 57 and the hole 58 of the piston 50, as shown.

The second floating piston 51 is biased by a spring 65 towards and against an annular seal 66 defining a valve seating member to stop the piston 51 closing the communication of the second releasing path 63 in respect to intermediate portion 53 of the pressure equalising chamber. An annular seal 67 is furtherly provided on the cylindrical extension 41' to prevent back flow between the inlet 43 and the intermediate chamber portion 53, through annular passage 63 of the second pressure releasing path.

Working of the device: the pressurised fluid at the inlet 43 is fed to the outlet 44 through path inside the chamber of the device, comprising the annular passages provided between the opposing peripheral surfaces of the floating pistons and the same chamber. The reversed disposition of the lip seals 45 is such to allows the feeding of the pressurised fluid from the inlet 43 to the outlet 44 preventing the flow in opposite direction. Therefore on both faces of the two pistons 50 and 51 a same pressure value will be established providing a balancing of corresponding action. At steady or in equilibrium condition, the biasing forces of the springs 56 and 65 will act to push forward respective pistons 50 and 51 for valving means to close the respective pressure releasing path 46 and 63.

In the event that a pressure drop occurs at the outlet side 44, the device immediately triggers to balance at the inlet pressure being the releasing paths 46 and 63 closed by respective floating pistons.

On the other side, when there is an increase of the pressure at the output 44 which pushes back the first floating piston 50 opening the relief valve to communicate the portion 48 of the chamber, with the first pressure releasing path 46, 49.

Since the piston 50, due to the increase of the pressure, is moved back, as shown by dotted line in FIG. 4, this displacement will cause a corresponding increase of the pressure in the intermediate portion 53 of the chamber, acting on the second floating piston 51 to move back the same. As the second piston 51 move back, it immediately opens the second pressure releasing path 63 which will release part of the pressurised fluid in the intermediate portion 53 of the chamber, towards the first pressure releasing path 46 to restore the equilibrium conditions of the pressure inside the device. Since the second piston 51 opens immediately the second pressure releasing path, irrespective of the length of the stroke of the same piston, it is therefore evident that in the unbalanced conditions, the pressure difference that will rise on opposite faces of first floating piston 50, is kept to a constant value independently from the displacement of the same piston. Therefore the control of the pressure value on the outlet side 44 of the device is not influenced by the operating mode and by constructional features of the same pressure equaliser device.

What is claimed is:

1. A pressure equaliser device for pressure fluid actuated load balancing systems, comprising:
    an hollow body defining a pressure chamber, having fluid inlet and fluid outlet at its ends;
    at least one floating piston in said chamber, and first pressure releasing means comprising a first pressure relief valve opening at the outlet side of said chamber, said pressure relief valve being operatively actuated by said floating piston;
    at least a fluid feeding path between the fluid inlet and the fluid outlet comprising said pressure chamber;
    and single-acting valving means on said floating piston to allow a fluid flow in said pressure chamber from said fluid inlet to said fluid outlet of the device.

2. A pressure equaliser device according to claim 1, comprising:
    first and a second floating pistons axially spaced in said pressure chamber, said floating pistons defining a first chamber portion on the outlet side, a second chamber portion on the inlet side, and an intermediate chamber portion between the same floating pistons of the device;
    a second pressure releasing means comprising a second pressure relief valve opening at said intermediate chamber portion; said first pressure relief valve being operatively actuated by said first floating piston; said second relief valve being operatively actuated by said second floating piston;
    and elastically yieldable biasing means urging said floating pistons to close said relief valves.

3. A pressure equaliser device according to claim 2, comprising guide means axially extending into said pressure chamber to axially guide said first and second floating pistons of the device.

4. A pressure equaliser device according to claim 2, in which said second pressure releasing means comprises conduit means inside said chamber opening into said first pressure releasing means.

5. A pressure equaliser device according to claim 1, said floating piston having a diameter smaller than the inner diameter of the pressure chamber, and in which said single-acting valving means comprises an annular lip seal on said floating piston.

6. A pressure equaliser device according to claim 4, in which said second pressure releasing means comprises conduit means axially extending in said piston guide means.

7. A pressure equaliser device according to claim 1, comprising:
    a sleeve member having first and second end closing piece means to define said pressure chamber;
    first and a second floating pistons axially spaced in said pressure chamber, said floating pistons defining a first chamber portion on the outlet side, a second chamber portion on the outlet side, and an intermediate chamber portion between the same floating pistons of the device;
    first pressure releasing means comprising a first pressure relief valve having a port on said first end closing piece said port coaxially opening into said outlet chamber portion, and seal means on the facing side of the first floating piston to close said pressure releasing port; second pressure releasing means comprising an aperture into a stem portion of said second end closing piece, coaxially extending into said intermediate chamber portion, and sealing means on said stem portion and second floating piston, to close said pressure releasing aperture;
    elastically yielding biasing means being provided to urge said first and second floating pistons to close said port and said aperture of said first and second pressure releasing means;
    and guide means axially extending into said pressure chamber for guiding said first and second floating pistons of the pressure equaliser device.

8. A pressure equaliser device according to claim 1, in which said first relief valve comprises a proportional type valve having a venting channel coaxially arranged at the outlet portion of the pressure chamber, and a slotted spool member connected to the floating piston, said spool member coaxially extending into said venting channel.

9. A pressure equaliser device according to claim 8, in which the outlet portion of the pressure chamber is directly connected to an annular fluid feeding chamber by a second flow path comprising an unidirectional valving means.

10. A pressure equaliser device according to claim 8, comprising:
- a hollow casing having an inlet and outlet for the fluid;
- a cup shaped element placed inside the hollow casing to define the aforementioned pressure chamber;
- and a floating piston axially sliding in the cup element,
- said cup element and said floating piston defining a first chamber portion which opens directly towards the inlet of the fluid, and a second chamber portion connected to the outlet, respectively to the inlet of the fluid via a pressure feeding path comprising an annular slot between the cup element and the cavity inside the casing, said annular slot opening into an annular chamber which is connected to the fluid inlet by an unidirectional diaphragm valve.

* * * * *